US012335267B1

United States Patent
Samek et al.

(10) Patent No.: US 12,335,267 B1
(45) Date of Patent: Jun. 17, 2025

(54) VISUAL EXPLORATION FOR EFFICIENT ACCESS ANALYSIS FOR CLOUD PROVIDER ENTITIES

(71) Applicant: Rapid7, Inc., Boston, MA (US)

(72) Inventors: Evan Samek, Washington, DC (US); Nicholas Tobolski, Arlington, VA (US); James Martin, Washington, DC (US); Mohamed Chalal, Oakton, VA (US); Alireza Abedinzadehvatankhah, Washington, DC (US); Kris Rivera, Alexandria, VA (US)

(73) Assignee: Rapid7, Inc., Boston, MA (US)

( * ) Notice: Subject to any disclaimer, the term of this patent is extended or adjusted under 35 U.S.C. 154(b) by 252 days.

(21) Appl. No.: 17/669,146

(22) Filed: Feb. 10, 2022

(51) Int. Cl.
   *H04L 29/06* (2006.01)
   *H04L 9/40* (2022.01)
   *H04L 41/22* (2022.01)

(52) U.S. Cl.
   CPC ............ *H04L 63/101* (2013.01); *H04L 41/22* (2013.01); *H04L 63/102* (2013.01); *H04L 63/20* (2013.01)

(58) Field of Classification Search
   CPC ...... H04L 63/101; H04L 41/22; H04L 63/102
   See application file for complete search history.

(56) References Cited

U.S. PATENT DOCUMENTS

| | | | |
|---|---|---|---|
| 6,202,066 B1 * | 3/2001 | Barkley | G06F 21/6218 |
| | | | 707/999.009 |
| 9,218,502 B1 | 12/2015 | Doermann et al. | |
| 9,516,028 B1 | 12/2016 | Andruschuk et al. | |
| 10,129,344 B2 | 11/2018 | Pogrebinsky et al. | |
| 10,880,189 B2 | 12/2020 | Martinez et al. | |
| 12,015,635 B2 | 6/2024 | Witschey et al. | |
| 12,021,900 B1 | 6/2024 | Gladney et al. | |
| 2005/0262132 A1 * | 11/2005 | Morita | G06F 21/6218 |
| | | | 707/999.102 |
| 2008/0104393 A1 | 5/2008 | Glasser et al. | |

(Continued)

FOREIGN PATENT DOCUMENTS

| | | |
|---|---|---|
| CN | 102307185 A | 1/2012 |
| KR | 20030057263 A | 7/2003 |

OTHER PUBLICATIONS

U.S. Appl. No. 17/543,599, filed Dec. 6, 2021, Matthew Gladney et al.

*Primary Examiner* — Jason K Gee
(74) *Attorney, Agent, or Firm* — Wolf, Greenfield & Sacks, P.C.

(57) ABSTRACT

An access policy analysis system may use visual exploration to efficiently perform access analysis. A request to display an effective access of an entity with respect to a resource hosted in a cloud provider may be received via a visual exploration user interface element. An analysis of a set of access policies applied by an access management system to determine an effective access of the entity with respect to the resource may be performed. One or more selectable access policy interface elements may be generated that correspond to one or more access policies of the set of access policies that are used to determine the effective access of the entity with respect to the resource. The one or more selectable access policy interface elements may be included in a display of the visual exploration user interface element along with the determined effective access of the entity with respect to the resource.

20 Claims, 10 Drawing Sheets

(56) References Cited

U.S. PATENT DOCUMENTS

| | | |
|---|---|---|
| 2011/0131275 A1 | 6/2011 | Maida-Smith et al. |
| 2013/0219156 A1 | 8/2013 | Sears |
| 2013/0290500 A1 | 10/2013 | Narendra et al. |
| 2014/0280961 A1 | 9/2014 | Martinez et al. |
| 2017/0054757 A1* | 2/2017 | Siswick .............. G06F 3/04842 |
| 2017/0141961 A1 | 5/2017 | Cao et al. |
| 2018/0091583 A1 | 3/2018 | Collins et al. |
| 2018/0268347 A1 | 9/2018 | Benedetti et al. |
| 2019/0121989 A1* | 4/2019 | Mousseau ............... H04W 4/70 |
| 2019/0327271 A1 | 10/2019 | Saxena et al. |
| 2020/0225655 A1 | 7/2020 | Cella et al. |
| 2022/0156631 A1 | 5/2022 | Kanso et al. |
| 2022/0210201 A1 | 6/2022 | Kastroulis |
| 2022/0263835 A1 | 8/2022 | Pieczul et al. |
| 2022/0353289 A1 | 11/2022 | Witschey et al. |
| 2023/0019705 A1 | 1/2023 | Zettel, II et al. |
| 2023/0090828 A1 | 3/2023 | Patro et al. |
| 2023/0148158 A1 | 5/2023 | Bandarupalli et al. |

* cited by examiner

702

704

VISUAL EXPLORATION FOR EFFICIENT ACCESS ANALYSIS FOR CLOUD PROVIDER ENTITIES

BACKGROUND

Cloud service providers offer opportunities to develop and host many different systems, services, or applications without imposing various infrastructure and other management responsibilities on customers. Because cloud service providers can host large numbers of systems, services, or applications, and the implementations of these different systems, services, or application is often distributed across many different resources, there are security and other operational risks when allowing different developers, users, or other entities access to the various resources hosted in a provider network. To mitigate these risks, cloud service providers have implemented access control systems, which allow customers of the cloud service providers to specify access controls for various entities with respect to resources hosted by the cloud service providers.

SUMMARY OF EMBODIMENTS

The systems and methods described herein may be employed in various combinations and in embodiments to implement an access policy analysis system that uses a visual exploration user interface to provide effective analysis results. A visual exploration user interface may be implemented that can receive a request to display an effective analysis of an entity with respect to a resource hosted in a cloud provider. The cloud provider may implement an access management system that applies a set of access policies with respect to the entity and resource. The access analysis system may interpret the sect of access policies to determine an effective access of the entity with respect to the resource. The access analysis system may generate selectable access policy interface elements that correspond to access policies of the set of access policies that are used to determine the effective access of the entity with respect to the resource. The access analysis system may include the selectable access policy interface elements in a display of the visual exploration user interface element along with the determined effective access of the entity with respect to the resource. Selection of the access policy interface elements may cause the addition or removal of the corresponding access policies from the effective analysis in the visual exploration user interface.

Figure 1:
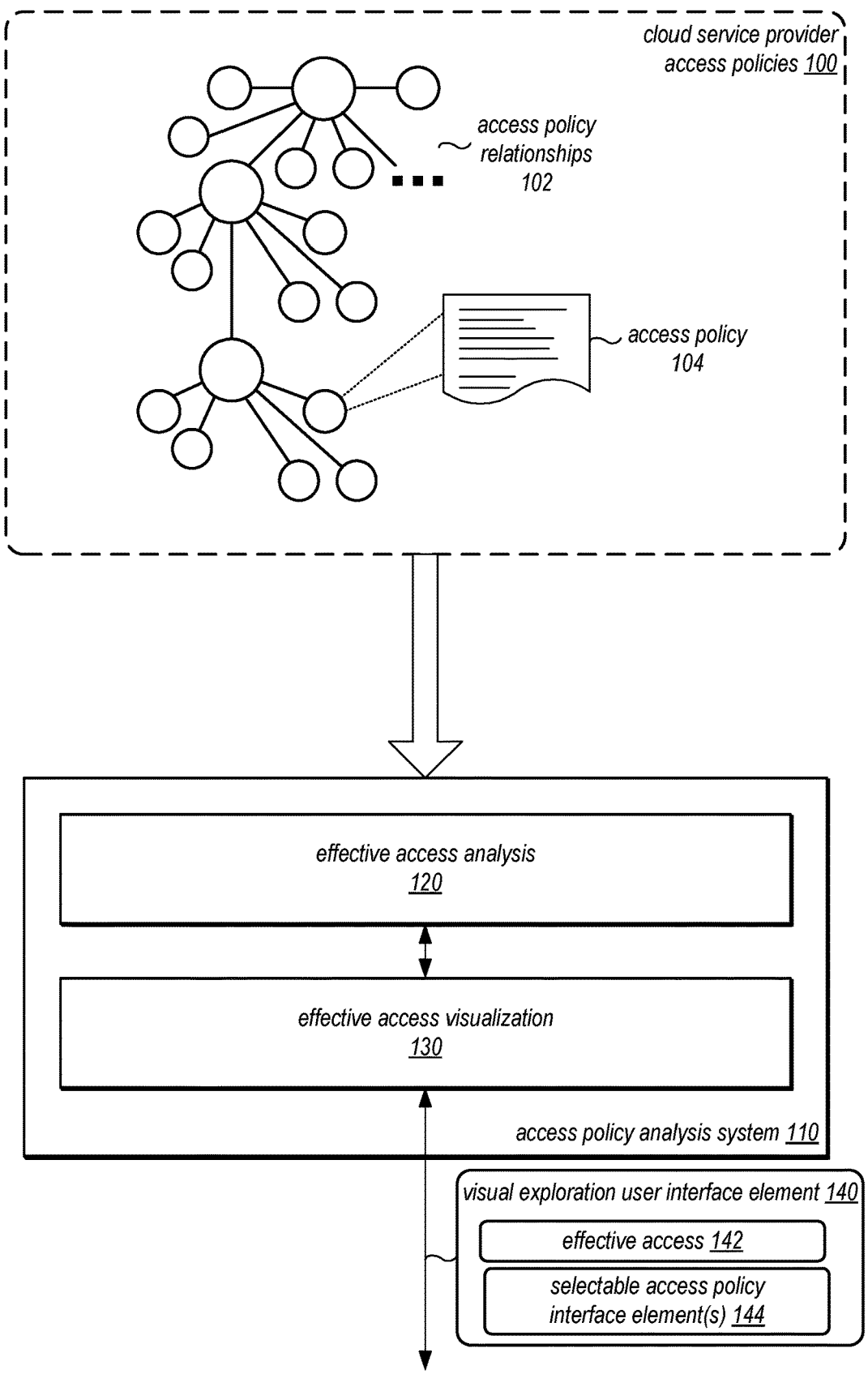
FIG. 1 is a block diagram illustrating using visual exploration for efficient analysis for cloud provider entities, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various techniques of using visual exploration for efficient analysis for cloud provider entities are described herein. Different cloud providers allow users to specify or manage the relationships between different entities that can take actions with respect to resources hosted in a cloud provider. For example, these relationships may include a hierarchy that relates one (or more entities) to another entity higher in the hierarchy. A principal, may be one example of an entity that could relate to other entities, such as a group of principals associated with a same account, and a group of accounts associated with a same organization. These or other relationships between entities may allow users of cloud providers to determine the allowed (or denied) actions of entities both with respect to particular entities and resources (e.g., by attaching or otherwise associating access policies that define the allowed actions to entities and resources) and through the relationships of entities with other entities (which may also have associated access policies). The ability of an entity to perform a respective action may thus depend upon a number of different variables (e.g., directly through associated access policies and the access policies associated with related entities and resources). Therefore, any attempt to correctly determine the access of different entities with respect to different resources in a cloud provider may have to account for a potentially large number of variables.

The larger the number of policies, resources, relationships, and entities that may be involved, the more difficult it is for any one user to understand the importance of any one policy within the larger set of policies, relationships, resources, and entities. For example, a security engineer or other user that designs and updates policies may want to understand the behavior of the access control system with respect to a particular entity and resource. Multiple policies may be applicable to the particular entity and resource which may have conflicting or interacting elements. In order for the security engineer to understand the effects of these multiple access policies, the types and relationships between access policies may have to be explored. Techniques that merely provide the result of applying the access policies without indicating the types and or relationships of the access policies involved may leave the security engineer without any understanding as to which access policy of the multiple applicable access policies is determinative. Moreover, in large organizations, multiple different users may be involved in the design and update of access policies, which increases the likelihood of different policies being created and applied that are not fully understood by the security engineer when attempting to understand the behavior of the access management system with respect to the entity and resource.

In various embodiments, visual exploration techniques may be implemented to provide those access policies that are applicable to a given entity and resource in order to understand the access controls that are enforced with respect to the given entity and resource. For instance, as discussed below a policy stack which indicates the types and relationships between access policies may be provided for a user to be able to view and interact with specific access control policies through the user of selectable access policy user interface elements. In this way, the conflicts or interactions of different access policies can be explored by the user to determine whether changes in the design of access policies, the addition of access policies, or the removal of access policies may provide a better security outcome.

Selectable access policy user interface elements may also provide users with the ability to understand the effect of access control policies without actually modifying the live set of access control policies at the cloud service provider. For example, a user may wish to understand whether a given access policy is causing a conflict that prevents desired access outcome for an entity (e.g., a principal that wants to write to a resource). The selectable access policy user interface would support a selection to remove one (or more) access policies to determine if the removal of the policies removes the conflict. Similar selections to add in access policies could be performed.

For at least the reasons, visual exploration for efficient effective access techniques improve the performance that access management systems can provide security to the various services, systems, applications, or other resources hosted by at cloud provider network. By exposing information about the relationships between access policies and effects of access policies that would not otherwise be available, visual exploration offers users insights into the operation of access management systems which in turn allows these users to better utilize the security features offered by access management systems. Such techniques also allow for security engineers to more quickly diagnose security flaws or identify security improvements in complex cloud service environments where large numbers of resources and entities may be affected by changes. Instead of making changes on live systems or creating costly replication environments, users can simulate the effects of adding or removing access policies through a visual exploration user interface element without actually incurring the results of those changes that could have if they were implemented by the access management system directly.

FIG. 1 is a block diagram illustrating using visual exploration for efficient analysis for cloud provider entities, according to some embodiments. Access policy analysis system 110 may be a standalone system, application, tool, or service that may evaluate a given set of access policies 100 for a cloud service provider, in some embodiments. As discussed in detail below with regard to FIG. 3, access policy analysis system 110 may be a feature of a larger application, system, or service, such as cloud security service 330. A cloud service provider may be a provider that offers access to various computing resources, services, applications, data storage or various other resources. Examples of cloud service provider 100 include, but are not limited to, GOOGLE CLOUD, AMAZON WEB SERVICES, and MICROSOFT AZURE.

In order to implement access controls to allow or deny various actions with respect to hosted resources, the cloud service provider may implement access policies that specify the various entities, resources, and actions allowed and denied for the different entities. Hierarchical relationships between different entities may be specified by establishing relationships or associations between "objects" representing the entities in the cloud servicer provider, such as access policy relationships 102, may be implemented as part of an access system or service of the cloud service provider that enforces access controls for the cloud service provider. Access policies, such as access policy 104, may be specified in proprietary or custom languages, scripts, interfaces, or other editors, or may be specified in various other languages or scripts, such as human readable scripts like Javascript Object Notation (JSON), among other possible languages or scripts. The relationships between the different objects can be modeled or specified in different ways, such as a hierarchical data structure like a tree or other hierarchy, in some embodiments.

Figure 2:
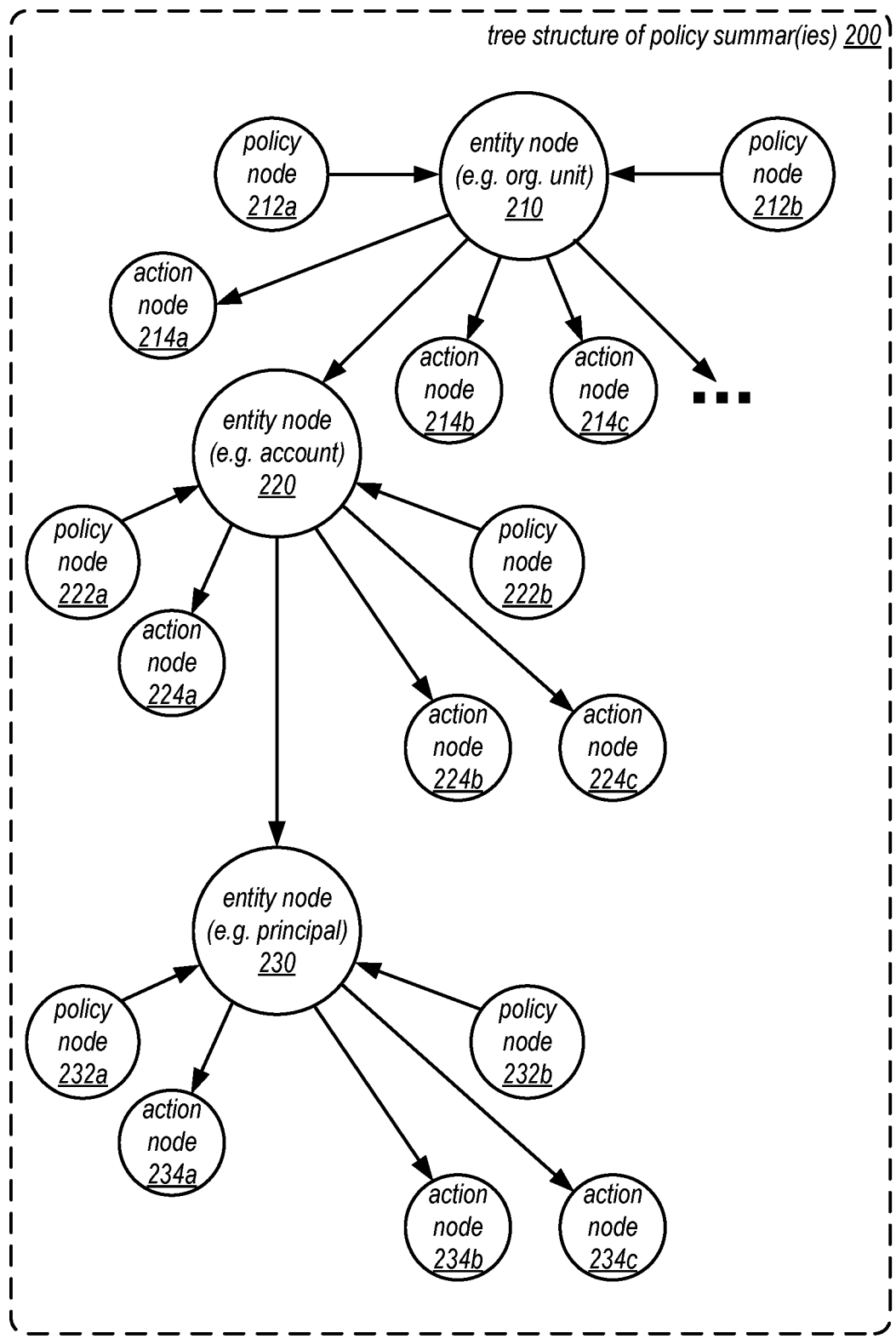
FIG. 2 is a block diagram illustrating a tree structure of policy summaries, according to some embodiments.

A set of cloud service provider access policies 100 may be maintained on behalf of an entity (or group of entities) that utilize the cloud service provider. For example, an organization that utilizes the cloud service provider may have an organization specific hierarchy that includes the various objects along with associations of policies (and in some cases resources). In some embodiments, these associations may be described as attachments between a policy and an object (e.g., an attachment of a service control policy to an organization or account object). Different types of access policies may be supported by cloud service provider. For example, access policies may have various parameters or limitations (e.g., applicable on a service-wide, resource-type, identity-type, entity-type or at various other scopes) that allow for different access policies to be associated with different entities or resources according to type. FIG. 2, discussed below, provides one example of a set of possible entities and policy types, among other features of an access management system that may be implemented using access policies.

A set of cloud service provider access policies 100 may be shared (e.g., made readable) or copied to access policy analysis system 110 in order to be used for performing access analysis. Access policy analysis system 110 may implement effective access analysis 120 to interpret or otherwise analyze cloud service provider access policies 100 to provide an effective access 142 as part of a visual exploration user interface element 140, along with selectable access policy interface element(s) 144. For example, effective access analysis 120 may provide, as discussed in detail below with regard to FIG. 5, the effective access 142, which may include those actions that are and are not allowed for the entity with respect to different resources and those access policies out of set of cloud service provider access policies 100 (e.g., a subset of one or more access policies) that are determinative of the effective access 142.

In various embodiments, effective access analysis 120 may implement an ingestion feature of access policy analysis 120 that may perform ingestion processing on set of cloud service provider access policies 100. For example, as discussed below, in some embodiments, policy summaries may be used to efficiently perform and update effective analysis. Therefore, the ingestion feature of effective analysis 120 may pre-generate and store policy summaries. In other embodiments, set of cloud service provider access policies 100 may be accessed on demand (e.g., on a first access analysis evaluation, and then subsequently accessed as needed to obtain information for performing subsequent access analyses). When the subsequent access analysis requests are received, only the access policies not included in an already generated policy summary may be obtained and evaluated.

For those embodiments that utilize policy summaries to determine effective access, policy summaries may be represented in different ways. Similar to FIG. 1, FIG. 2 is a block diagram illustrating a tree structure of policy summaries, according to some embodiments, which may provide an efficient way of relating the different policy summaries generated for set of access policies when performing policy summary analyses. In various embodiments, a tree structure of policy summar(ies) may be maintained (e.g., in a data store, such as a database, object store, or other data storage system or device) accessible to or implemented as part of access policy analysis system 110. In this way, stored policy summaries may be identified and accessed, as discussed below. Note, however, that the techniques for effective access visualization may be performed using other analysis data structures (e.g., non-tree structures) or without policy summaries (e.g., by running an analysis on-demand to obtain cloud service provider access policies 100. Thus, the example analysis techniques discussed below are not intended to be limiting to other effective analysis techniques in other embodiments upon which visual exploration techniques may be implemented.

Effective access analysis 120 may implement a policy summary generation feature to generate, from set of clouds service provider access policies 100 that are applicable to an entity and resource (e.g., attached or otherwise associated with the entity and the resource), which may be received as input via visual exploration user interface element 140, respective policy summaries, entity access policy summaries, and resource access policy summaries. Note that in some scenarios, one (or both) of these access policy summaries may be empty as there may be no access policies that are applicable to a received entity and a received resource. However, even in such a case there may be policies applicable to other entities through which the entity and resource inherit access policies (e.g., from parent entities in the hierarchy of entities). In some embodiments, prior to generating an entity policy summary or resource policy summary a check may be performed as to whether the entity policy summary or resource policy summary has already been generated. If so, then instead of generating a policy summary, the policy summaries may be obtained and provided to policy summary analysis.

Effective access analysis 120 may generate policy summaries according to various techniques. For example effective access analysis 120 may implement various language, script, or other types of parsers to extract access permissions and other information from access policies applicable to a received entity or a received resource in order to generate policy summaries (e.g., from statements in access policies). Effective access analysis 120 may create the appropriate data structures to summarize the effect of access policies in a format which corresponds to a tree structure of policy summar(ies), discussed in detail below with regard to FIG. 2.

Effective access analysis 120 may implement a policy summary analysis feature to obtain the entity access policy summary and resource access policy summary as well as perform various operations to traverse tree structure of policy summar(ies) in order to identify and access parent node policy summar(ies) as part of generating an access analysis. For example, given a received entity (e.g., a principal) and a received resource, effective access analysis 120 may be able to determine "allowed" actions by the principal with respect to the resource, providing an effective access of the principal to the resource that would be allowed by the cloud service provider according to set of cloud service provider access policies 100 using parent policy summar(ies) as well as a corresponding policy summary for the entity under consideration for access analysis. As discussed in detail below with regard to FIG. 2, the use of parent node policy summaries identified and accessed from tree structure of policy summar(ies) may be used to determine the maximum permissions for given entity, which can then be refined by policies specific to the entity and resource (e.g., from resource policy access summary). Consider an example, wherein some actions are "deny" as determined from parent node policy summar(ies), such actions need not be considered again when evaluating other possible permutations of actions with respect to resource by entity.

Access policy analysis system 110 may implement effective access visualization 130, in various embodiments. Effective access visualization 130 may implement various graphical or other user interface elements to provide visual exploration techniques for an effective access determined for an entity and resource. For example, effective access visualization 130 may implement a graphical user interface, such as the visual exploration user interface element 610 discussed below with regard to FIG. 6, or various other arrangements or forms of user interface elements that may provide a visual exploration of the effective access determined for the entity and resource.

Figure 4:
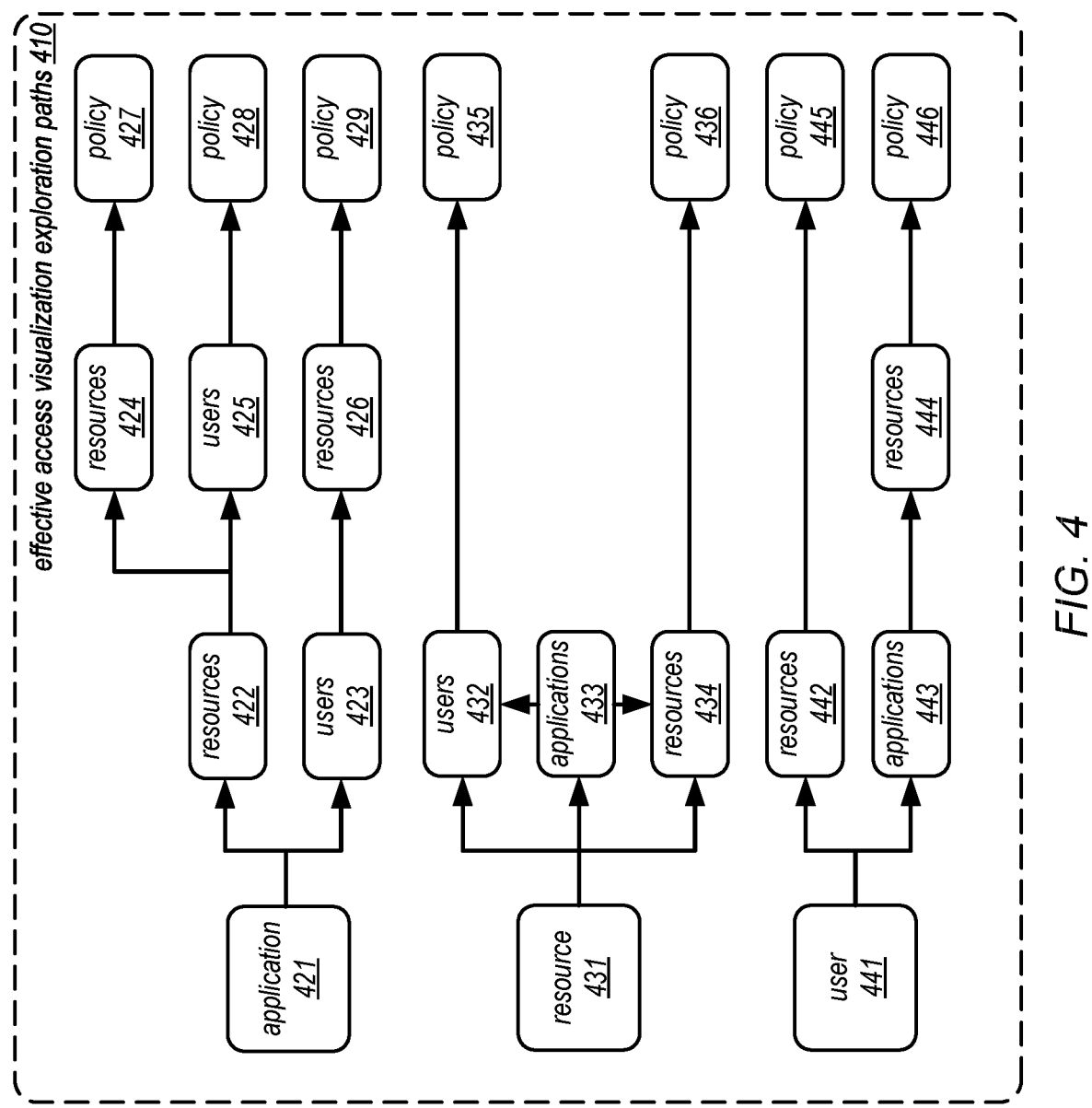
FIG. 4 is a block diagram illustrating example visual exploration paths, according to some embodiments.

As noted earlier, effective access visualization 130 may implement interface elements to receive an entity and resource in order to obtain an effective access for the entity and resource determined from cloud service provider access policies 100. FIG. 4 provides various examples of different exploration paths that may be supported by effective access visualization.

Effective access visualization 130 may provide visual exploration user interface element 140 to various clients (e.g., users operating a client device, such as a computing device that implements a web browser capable of interacting with effective access visualization 130. Visual exploration user interface element 140 may provide both the result of analysis, effective access 142 for a received entity and resource, but also various user interface elements that can manipulate the display of effective access 142, including selectable access policy interface element(s) 144, which may be used to add or remove access policies from the effective access analysis, as discussed in detail below with regard to FIGS. 7-9.

As noted above, FIG. 2 is a block diagram illustrating a tree structure of policy summaries, according to some embodiments. The relationships between policies and entities may be used to store and relate policy summaries so that tree structure may be traversed and updated in order to efficiently identify applicable policy summaries and store new/updated policy information with respect to entities. In some embodiments, entity nodes, such as entity node 210, 220, and 230 may be used to represent different possible entities in a cloud service provider. In some embodiments, tree structure of policy summa (ies) may be referred to as an action map.

Different cloud service providers may utilize different names, hierarchies, or other taxonomies of entities that can perform actions with respect to resources of a cloud service provider when permitted according to access policies. In one example embodiment, used as a working example below, entities may include organization units, accounts, and principals. In some embodiments, entities, such as principals may be federated, where the federated entity has different instantiations in different cloud service providers or access management systems. The techniques described below for entities (e.g., visual exploration for effective access) may be performed for federated entities as well as non-federated entities. Organization units may be used to collect one or more lower-level entities that can be managed together (e.g., accounts). Accounts may be an entity used to manage one or more lower-level entities (e.g., principals) and associated resources. Principals may be an entity that can act on a resource (e.g., a user or application). Thus, in FIG. 2, entity node 210 may include entity node 220 as one of possibly multiple accounts managed together as an organization unit. Likewise, entity node 220 may be an account that manages entity node 230 as a principal of possibly multiple principals managed together in the account.

Entity nodes may, in some embodiments, store a policy summary according to a schema (e.g., a schema common to all entity nodes or a schema common to an entity type, such as an organization unit, account, or principal). For example, entity node 210 may store a policy summary according to the following organization unit schema:

```
OU_Summary={
    'service': {
    'action': ActionNode,
    '*': ActionNode
    },
    'service': {
    'action': ActionNode,
    '*': ActionNode},
        'service_control policies': {'scp_identifier',
        'scp_identifier'}
}
```

Note that in such a summary, other objects in a tree structure, such as action nodes, like action nodes node 214a, 214b, and 214c, may be referenced, which may allow for information stored in the action nodes to be incorporated into the policy summary for stored for the organization unit.

Below is an example of an organization unit summary:
```
OU_Summary_Sample={
    'virtual compute_service': {
        'describeinstances': ActionNode,
        'describekeypairs': ActionNode,
        'describesecuritygroups': ActionNode,
        'describeavailabilityzones': ActionNode,
        'runinstances': ActionNode,
        'terminateinstances': ActionNode,
        'stopinstances': ActionNode,
        'startinstances': ActionNode
    },
    'object_storage_service': {
        '*': ActionNode,
        'listallmyobjects': ActionNode,
        'headobject': ActionNode
    },
    'service_control policies': {
        'policy_1_identifier',
        'policy_2_identifier',
        'policy_3_identifier',
    }
}
```

Continuing with the example, entity node 220 may correspond to an account. An account policy summary be stored according to an account policy summary schema, such as:
```
Account Summary={
    'service':
        {'action': ActionNode,
        'action': ActionNode,
        '*': ActionNode
    },
    'service':
        'action': ActionNode,
        '*': ActionNode
        },
    'service_control policies': {
        'scp_identifer',
        'scp_identifer'
    }
}
```

Below is an example of an account summary:
```
Account Summary_Sample={
    'virtual_compute_service': {
        'describeinstances': ActionNode,
        'describekeypairs': ActionNode,
        'describesecuritygroups': ActionNode,
        'describeavailabilityzones': ActionNode,
        'runinstances': ActionNode,
        'terminateinstances': ActionNode,
        'stopinstances': ActionNode,
        'startinstances': ActionNode
    },
    'object_storage_service': {
        '*': ActionNode,
        'listallmyobjects': ActionNode,
        'headobject': ActionNode
    },
    'service_control policies': {
        'policy_1_identifier',
        'policy_2_identifier',
        'policy_3_identifier',
    }
}
```

Continuing with the example, entity node 230 may correspond to a principal. An account policy summary be stored according to an account policy summary schema, such as:

```
Principal_Summary = {
    'principal_arn': {
        'service': {
            'action': ActionNode,
            'action': ActionNode,
            '*': ActionNode
        },
        'condition_payload':  ConditionPayload(
                        entity=' IAM entity',
                        principal_account='account number',
                        principal_identifier='full identifier',
                        region= 'region',
                        tags=   {
                                'condition key':
                                'condition value',
                                'condition key':
                                'condition value'
```

```
        },
            org_paths='org path') ,
        'permission_boundary_policy': {
            'pb_identifier',
            'pb_identifier'
        }
    }
}
```

Below is an example of a principal summary:

```
Principal_Summary_Sample = {
    'principle_identifier': {
        'object_storage_service': {
            'listallmyobjects': ActionNode,
            'headobject': ActionNode,
            '*': ActionNode
        },
        'condition payload': ConditionPayload(
                    entity= 'principal',
                    principal_account='identifier',
                    principal_identifier='full_id',
                    region='',
                    tags= {
                        'test-key': 'test-value',
                        'BESTKEY': 'TEST'
                    },
                    org_paths=None) ,
        'permission_boundary_policy': {
            'pb_identifier1',
            'pb_identifier2'
        }
    }
}
```

In addition to entity nodes, policy nodes, such as policy node 212a, 212b, 222a, 222b, 232a, and 232c may be stored as part of a tree structure of policy summar(ies). Policy nodes may correspond to various types of policies. Like entities, different cloud service providers may utilize different access policies for specifying allowed or denied actions with respect to resources of a cloud service provider which may be applied to associated entities. For example, different policies may include, in some embodiments, service_control policies (e.g., associated with entities, such as organization units or accounts), resource-based policies (e.g., associated with resources), identity-based policies (e.g., associated with entities such as principals), or permission boundary policies (e.g., an identified policy that may define the maximum permissions that can be granted), among other policy types.

Policy nodes may provide a portion of information used to produce or represent a policy summary, in some embodiments. An example of a schema for a policy summary may be:

```
Policy_Summary_Sample={
    'statements': ["List of statement hashes"],
    'summary': {
        'service': {
            'action': 'Allow|Deny',
            'action': 'Allow|Deny',
        }
        'service': {
            'action': 'Allow|Deny'
            'action': 'Allow|Deny'
        }
    }
}
```

Below is an example of a policy summary:

```
Policy_Summary = {
    'statements': ["List of statement hashes"],
    'summary': {
        'virtual_compute_service': {
            'describesecuritygroups': 'Deny',
            'runinstances': 'Allow'
        },
        'object_storage_service': {
            'listallmyobjects': 'Deny'
        }
    }
}
```

In various embodiments, statement summaries may also be used to store the effects of access policy statements in order to increase reusability, which lowers computational costs when generating an access analysis for an entity. An access policy may be specified using different statements (as noted earlier). A statement summary may be generated from one (or more) statements, stored, and then referenced by policy summaries (allowing the same statement policy summaries to be used by different policies when logically equivalent to the statements found in the different policies).

For instance, in the example policy above, the "statements" section includes a "List of statement hashes." These statement hashes may be used to lookup to statement summaries which describe the effect of the statements that implement the policy being summarized. Moreover, when new statement(s) (e.g., statements that have not been analyzed before) are encountered, a new statement summary and new entry may be added corresponding to the "new" hash value produced.

Statement hashes may be generated from the contents of one (or more) portions of the statement(s) that are summarized, which may allow for a hash value generated from other statement(s) using the same hash scheme to produce a hash value that would map to an existing statement. The data structure that stores summaries (e.g., the action map referenced above) may then have different corresponding entries for the respective hash values of each statement summary which can be located when performing access analysis.

An example of a schema for a statement summary may be:

```
Statement Summary_Sample={
    'summary':
        {'service': {
        'action': 'Allow Deny',
        'action': 'Allow Deny'
        }
    }
    conditions': {
        'condition statement(s) to be evaluated'
    },
    'resources': {
        'resource identifiers'
        '*'
        etc.
    }
}
```

As illustrated in FIG. 2, various action nodes, such as action nodes 214a, 214b, 214c, 224a, 224b, 224c, 234a, 234b, and 234c may be included in tree structure of policy summar(ies), which may indicate the actions that may allowed (or denied). An example schema of an action node may be described as:

```
Action_Node={
  'Effect': 'Allow Condition Deny',
  'policy_type': [
    'policy_identifier',
    'policy_identifier'
  ],
  'policy_type': [
    'policy_identifier',
    'policy_identifier'
  ],
  'policy_identifier': [
    'policy_identifier',
    'policy_identifier'
  ],
  'SharedWithParent': 'True False',
  'OverrodeParent': 'True False',
  'policy_Implicit_Deny': 'True False',
}
```

An example of an action node specified according to the above schema may be:

```
Action Node Sample={
  'Effect': 'Allow',
  'Identity_Policies': [
    'identity_policy_A'
  ],
  'Permission Boundary Policies': [
    'permission_policy_1'
  ],
  'Service_Control Policies': [
    'service_control_policy_1'
  ],
  'SharedWithParent': False,
  'OverrodeParent': False,
  'PB Implicit_Deny': False,
  'SCP_Implicit_Deny': False
}
```

Storing policy summaries as part of a tree structure may support various traversal techniques to identify different stored policy summaries when generating an access analysis. In one traversal technique in one embodiment, the following steps may be performed. For instance, policies attached to a root entity (or other node) of tree-structure may be accessed and added to various summary objects (if not present). If, for example, policy node 212b is not included in the policy summary as represented in entity node 210 and (or) action node(s) 214a, 214b, or 214c, the corresponding access policy (e.g., a service_control policy) may be parsed to determine which actions are permitted or denied for a given service of a cloud provider network (e.g., as specified in access policy statements). Then updates to action node(s) may be updated (or created) to store the effects of the new policy. For example, action node 214a may be created (or updated) to include an action from the parsed policy and its respective action (allow or deny) along with various other information as described in the action node schema discussed above.

After considering the root entity, a next entity node, such as entity node 220, may be identified. This identity node may be identified according to the location of a corresponding entity node in tree structure of policy summar(ies) 120 of a given entity under analysis. For example, a principal corresponding to entity node 230 were given (e.g., in a request) for access analysis, then the portions of tree structure of policy summar(ies) 120 that include the entity node 230 may be considered (e.g., entity node 220 and entity node 230), while other portions of tree structure policy summar(ies) 120 that are not included (e.g., other principal entity nodes, other account entity nodes, and other organization unit nodes, which are not illustrated in FIG. 2) may be excluded from evaluation. As with the previous entity node, any policies that have not been evaluated may be used to update policy summaries. In some embodiments, a same policy (e.g., a service control policy) may be attached or otherwise associated with multiple different entities. Thus, by storing the summaries of policies, the work of parsing summaries may be saved (even if new action nodes for an entity that has not previously been updated as associated with the policy may be updated) and used again for updating tree structure of policy summar(ies) 120. In some embodiments, the policy summar(ies) from a parent entity node (e.g., entity node 210) may be compared with any new policies. If a "deny" is found, for example, then a corresponding action node for the current entity node 220 may be updated as well so that action nodes attached to entity node 220 (e.g., action nodes 224a, 224, and 224c) reflect the application of both parent policies and policies directly attached to entity node 220.

The next entity node may be considered, in some embodiments, entity node 230, which is a child node of entity node 220 and which is the entity node under consideration for access analysis (e.g., the principal under consideration). As with the previous entity nodes, any policies that have not yet been evaluated may be used to update policy summaries. For example, for principals, other types of policies may be applied, such as an identity policy. These unevaluated policies may be parsed, and their statements used to update action nodes, such as action nodes 234a, 234b, or 234c. Similar to the discussion above, the policy summar(ies) from a parent entity node (e.g., entity node 220) may be compared with the newly evaluated policies. In some embodiments, any actions that appear in policies directly attached to entity node 230 but do not appear in parent entity node 220 may be updated as "deny" because the intersection of actions allowed in the parent and child may be the allowed actions in the access analysis (e.g., a deny in either location may always override an allow (or non-statement) in another policy).

In some embodiments, some determinations at one location in a tree structure of policy summaries may be propagated to other locations. For example, a deny of an action node (e.g., an action for a particular service of a cloud provider) attached to a higher entity node (e.g., a deny for action node 214a) may propagate down to the corresponding action nodes that are for the same action in child entity nodes (e.g., deny may also be stored in action node 224a and 234a). Such techniques may reduce the evaluation of actions at the lower-level entity nodes, in some embodiments.

Please note that previous descriptions of a set of cloud service provider access policies 100, access policy analysis system 110, and visual exploration user interface element 140 are not intended to be limiting, but are merely provided as example embodiments. As discussed below, various different computing systems or devices may implement techniques for using visual exploration for efficient analysis for cloud provider entities.

This specification continues with a general description of a cloud security service that may implement using visual exploration for efficient analysis for cloud provider entities. Then various examples of the cloud security service are discussed, including different components/modules, or arrangements of components/module, that may be employed as part of implementing the cloud security service, in some embodiments. A number of different methods and techniques to implement using visual exploration for efficient analysis for cloud provider entities are then discussed, some of which are illustrated in accompanying flowcharts. Finally, a description of an example computing system upon which the various components, modules, systems, devices, and/or nodes may be implemented is provided. Various examples are provided throughout the specification.

Figure 3:
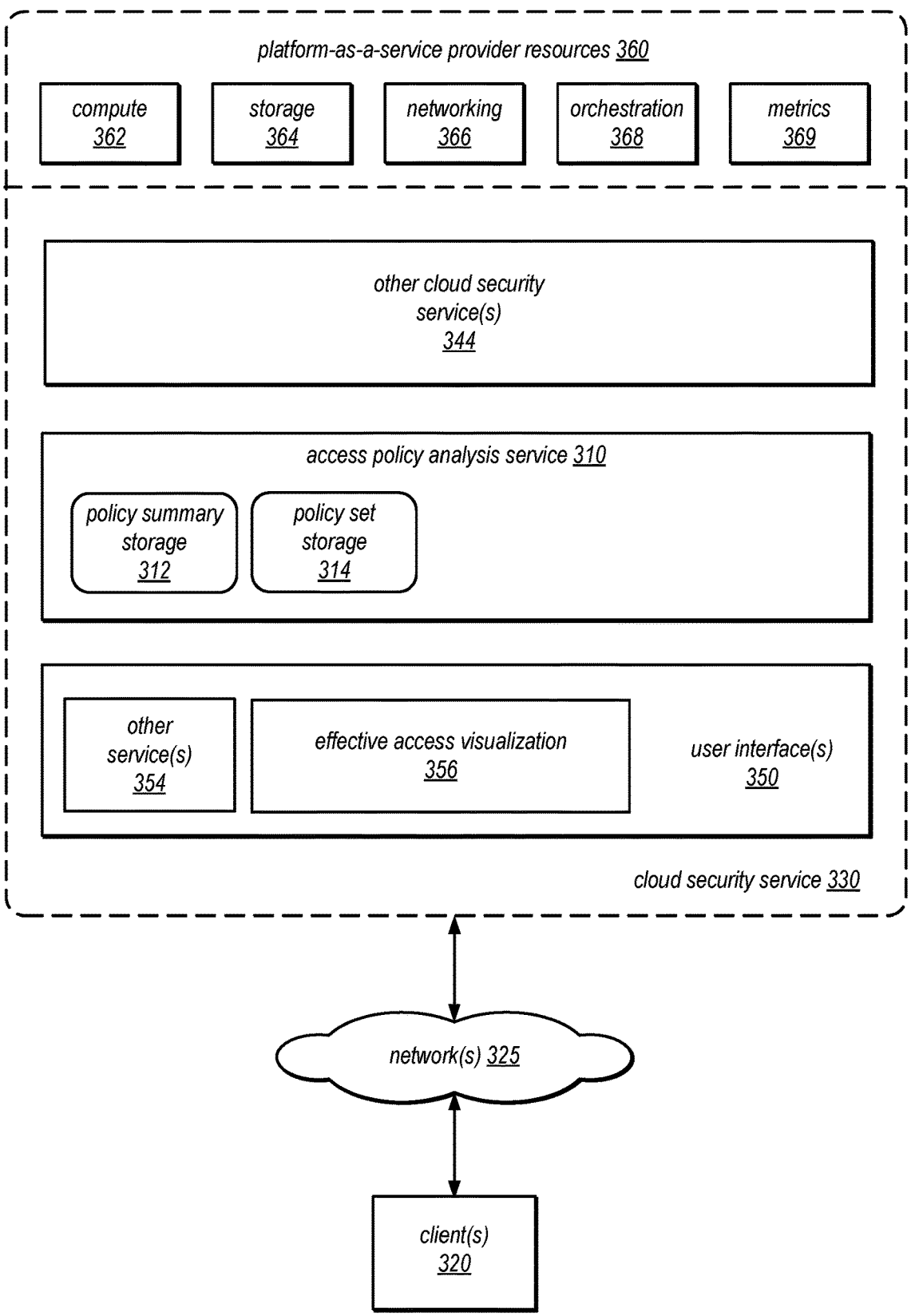
FIG. 3 is a block diagram illustrating a cloud security service that includes an access policy analysis service that uses visual exploration for efficient analysis for cloud provider entities, according to some embodiments.

FIG. 3 is a block diagram illustrating a cloud security service that includes an access policy analysis service that uses visual exploration for efficient analysis for cloud provider entities, according to some embodiments.

As shown in the figure, a cloud security service 330 is implemented using a platform-as-a-service (PaaS) provider network 360 (which may itself be a cloud provider network in some embodiments). The cloud security service 330 may be operated by a provider company to provide a number of cloud-based client-facing cloud security services 310 and 344 to various clients. Client(s) 320 may be operated by different groups, organizations, companies, or other types of entities that are customers of the cloud security service 330. In some embodiments, different clients may be associated with different user accounts of the cloud security service 330.

Client(s) 320 may enable, disable, execute, or otherwise configure (through user interface(s) 350), various security services 310 and 344, on behalf of different resources hosted in a cloud provider service. For example, access policy analysis service 310 may provide effective access analysis for access policies of a cloud provider, as discussed in detail above with regard to FIG. 1 and below with regard to FIGS. 4-9 through effective access visualization 356. Other cloud security service(s) 344 may include, but not limited to, visibility and monitoring services to maintain an accurate inventory of different cloud provider resources, automate and provide real-time remediation security controls and tools, risk assessment and auditing of resources in a cloud provider service, threat detection, resource configuration change monitoring, code security and compliance, among other cloud security services. A cloud provider service may be the same as the PaaS service or a different cloud service provider, and may include different types of computing, storage, networking, orchestration, and metrics resources. For example, computing resources may include different virtual machines that are an instance of an emulated computer or execution environment that is hosted on a physical virtual machine host. The virtual machine host may implement virtualization hardware and/or software (e.g. hypervisors) to execute and manage multiple instances of guest operating systems. Example implementations of such virtualization technologies include VMWARE ESX/ESXI, MICROSOFT HYPERV, AMAZON WEB SERVICES, and MICROSOFT AZURE. Another type of virtual machine is the container, which provides a portable and isolated execution environment over a host operating system of a physical host. Example implementations of container technologies include DOCKER, GOOGLE KUBERNETES, AMAZON WEB SERVICES, and MICROSOFT AZURE. Similar techniques may be implemented to host other computing, storage, networking, orchestration, or other resources. For example, instances may be database instances that host a database system or a data storage instance that hosts a virtual disk or other storage device. As discussed above with regard to FIG. 1, access to these computing resources by various entities of the respective cloud service providers may be allowed or denied according to specified access policies.

In various embodiments, the network(s) 325 may encompass any suitable combination of networking hardware and protocols necessary to establish communications between the client(s) 320 and the cloud security service 330. In some embodiments, client(s) 320 may execute in a private network of a company, behind a company firewall, and the network 325 may include a public network such as the Internet, which lies outside the firewall. The network 325 may encompass the different telecommunications networks and service providers that collectively implement the Internet. In some embodiments, the network 325 may also include private networks such as private local area networks (LANs), private wide area networks (WANs), or private wireless networks. The network 325 may be implemented using different hardware (e.g., modems, routers, switches, load balancers, proxy servers, etc.) and software (e.g., protocol stacks, accounting software, firewall/security software, etc.) for establishing networking links between client(s) 320 and the cloud security service 330.

As shown, the cloud security service 330 may implement access policy analysis service 310. Access policy analysis service 310 may implement policy set ingestion, which may proactively obtain an access policy set by reading from a specified storage location for access policy set or by obtaining access credentials to obtain access to the set of access policies in the cloud service provider. In some embodiments, policy set ingestion may receive access policy set as part of an interface implemented by cloud security service, such as effective access visualization 356 implemented as part of user interface(s) 350.

Access policy analysis service 310 may store a copy of the access policy set, in some embodiments, in policy set storage 314. For example, policy set ingestion may access (or create) a storage location corresponding to an account of cloud security service 330 associated with policy set to store the policy set. In some embodiments, policy set ingestion may check for subsequent updates to the access policy set (e.g., by polling for updates). In some embodiments, policy set ingestion may receive and then store updates to the policy set.

In some embodiments, access policy analysis service 310 may implement policy summary generation to generate (prior to any analysis request) at least a portion of a tree structure for policy summaries. For example, policy summary generation may access the various policies, entities, and resources specified in policy set to create or update a tree structure in policy summary storage 312. As discussed above with regard to FIGS. 1 and 2, policy summaries may be created according for different entities including links, branches, or other paths between entities that indicate relationships between entities (e.g., organization unit→account(s)→principal(s)) which may then be later traversed as part of performing an access analysis. In some embodiments, tree structure of policy summar(ies) may be incrementally updated as new access policies are obtained and added to policy set.

Access policy analysis service 310 may implement policy summary analysis to generate an effective access according to the techniques discussed above with regard to FIGS. 1 and 2. For example, a request, such as policy analysis request may be received via effective access visualization 356, which may specify an entity (e.g., a principal by a principal identifier) and one (or more) resources (e.g., by resource identifier) for which an effective access is to be generated.

Access policy analysis service 310 may determine which policy summaries need to be generated and which stored policy summaries exist that can be used to generate access analysis. For example, policy summary analysis may start with a root node of tree structure of policy summaries, and traverse down the tree structure of policy summaries to obtain stored policy summaries for relevant entity nodes in a path leads to the entity specified in policy analysis request. For example, a root entity node (e.g., organization unit), one or more interior entity nodes (e.g., account entity node), and a leaf entity node (e.g., a principal entity node) may be obtained. Note, as discussed above, that each policy summary obtained from tree structure may be updated to include new information from newly encountered access policies (e.g., access policies added or modified after a policy summary was generated). In some embodiments, policy summary analysis may be able to use version numbers or timestamps to identify whether a policy summary reflects a most recent set of access policies in order to determine whether an existing (or new) access policy needs to be evaluated and used to update a policy summary.

In some scenarios, a policy analysis request may rely upon stored policy summaries obtained from tree structure of policy summar(ies) to generate effective access (e.g., when a policy summary for a requested entity already exists). In some scenarios, new policy summaries may be generated. For example, an entity may be a principal that has not been evaluated before and thus no policy summary analysis for that principal may be stored in tree structure of policy summar(ies). Policy summary analysis may obtain the entity policy summary from policy summary generation which may (as discussed earlier) access the policy set associated with a user/account of cloud security service and policy analysis request, in order to obtain resource/entity policies (e.g., policies attached or otherwise associated with the entity and resource). Policy summary generation may then parse the obtained policies to extract permissions and produce the entity and policy summaries provided to policy summary analysis.

Policy summary analysis may then return effective access which may specify the allowed action(s) for resource(s) by the entity.

Access policy analysis service 310 may implement policy set storage 314, as discussed above, in some embodiments. Policy set storage 314 may be an object, file, database, or other data storage system that can store set of access policies that are to be considered when performing an access policy analysis for a user. Policy set storage 314 may, for example, index different sets of policies tied to different accounts of cloud security service 330 (e.g., according to an account identifier) so that when ingestion or access analysis is performed on behalf of a user associated with the account, the correct policy set is accessed and used. Moreover, policy set storage 314 may implement various security or other controls for restricting access to policy sets to perform authorized analyses (e.g., only a user of an account can access that account's set of access policies and not another user of another access account).

Access policy analysis service 310 may implement policy summary storage 312, as discussed above, in some embodiments. Policy summary storage 312 may be an object, file, database, or other data storage system that can store policy summaries and corresponding structures (e.g., the policy summaries and tree structure of policy summar(ies) 120 discussed in detail above with regard to FIG. 2) that are to be used when performing an access policy analysis for a user. Policy summary storage 312 may, for example, index different sets of policy summaries and tree structures tied to different accounts of cloud security service 330 (e.g., according to an account identifier) so that when ingestion or access analysis is performed on behalf of a user associated with the account, the correct set of policy summaries and tree structure is accessed and used. Moreover, policy summary storage 312 may implement various security or other controls for restricting access to policy summaries to perform authorized analyses (e.g., only a user of an account can cause access to that account's set of policy summaries and tree structure and not another user of another access account).

As shown, the cloud security service 330 may also implement a user interface 350, which provides the interfaces for other services 354 and effective access visualization 356. Effective access visualization 356, as discussed in detail below with regard to FIGS. 4-9, may provide a visual exploration user interface element which users may interact with to obtain and manipulate an effective analysis for an entity and resource. The user interface 350 may be a web-based interface that is accessible via a web browser. The user interface 350 may be a graphical or command line user interface. In some embodiments, the user interface 350 may also include real-time notification interfaces such as email or text interfaces. In some embodiments, the user interface 350 may be implemented as part of a user console to allow users to configure various aspects of the cloud security service 330, receive assessments reports, and carry out remediation actions. In some embodiments, the user interface 350 will allow users to specify how access policy analysis service 310 should operate (or how other cloud security service(s) should operate).

As a whole, the cloud security service 330 may be implemented as a number of web services that receive web services requests formatted as JSON documents. The cloud security service 330 may support REST-style or document-based (e.g., SOAP-based) types of web services requests. In some embodiments, the cloud security service 330 may implement service interfaces using other types of remote procedure calling protocols, such as GOOGLE PROTOCOL BUFFERS or PROTOBUF. The PaaS provider network may provide hardware and/or software to implement service endpoints, such that a request directed to that endpoint is properly received and processed.

As shown, the PaaS provider network may provide different types of computing resources 360 for the machine monitoring service 330, which can be leased by the operator of the machine monitoring service 330. The PaaS provider may provide resource services such as compute resource service 362, storage resource service 364, networking resources service 366, orchestration service 368, and resource metrics service 369. The services of the cloud security service 330 may be built using these underlying resource services provided by the PaaS provider. In some embodiments, the PaaS resources 360 may implement features such as load balancing of incoming service requests and/or dynamic management and scaling of service node pools. In some embodiments, each of the services 310 and 344 may be implemented using a pool of service nodes provided by the PaaS provider, which may be individual instances of virtual machines. In some embodiments, the PaaS provider may be a provider such as AMAZON WEB SERVICES or MICROSOFT AZURE.

Effective access visualization 356 may provide various paths for users to navigate through and obtain information, including the effective access and polic (ies) determinative of the effective access. FIG. 4 is a block diagram illustrating example visual exploration paths, according to some embodiments. Effective access visualization exploration paths 410 may be implemented using various navigation user interface elements, such expandable and collapsible lists in a tree or hierarchy format, a series of user interface elements with various prompts to elicit further information, search input elements, or various other user features that may implement the following paths.

One example path may start with receiving an application 421. An application, like application 421, may be the project, organization, or other entity which may be linked to or related to other cloud provider service features. For example, application 421 may be associated with a set of one (or more) resources 422. Likewise, application 421 may be associated with one (or more) users 423. Navigation to either resources 422 or users 423 may lead to further steps along the exploration path. Resources 422 may be linked to other resources 424 (e.g., a database resource is linked to storage volume resources that store data for the database resource), which may lead to one or more applicable policies 427 which may be determinative of an effective access. Alternatively resources 422 may be linked to users 425, which may lead to one or more applicable policies 428. Users 423 may be linked to resources 426, which may lead to one or more applicable policies 429.

Another example path may start with a resource, such as resource 431. Resource 431 may be linked to one or more users 432, which may lead to one or more applicable policies 435. Resource 431 may be linked to one or more further resources 434, which may lead to one or more applicable policies 436. Resource 431 may be linked to one or more applications 433, which may in turn be linked to users 432 or resources 434.

Another example may start with a user, such as user 441. User 441 may be linked to one or more resources 442, which may lead to one or more applicable policies 445. User 441 may be linked to one or more applications 443. Applications 443 may be linked to one or more resources 444, which may lead to one or more applicable policies 446.

Figure 5:
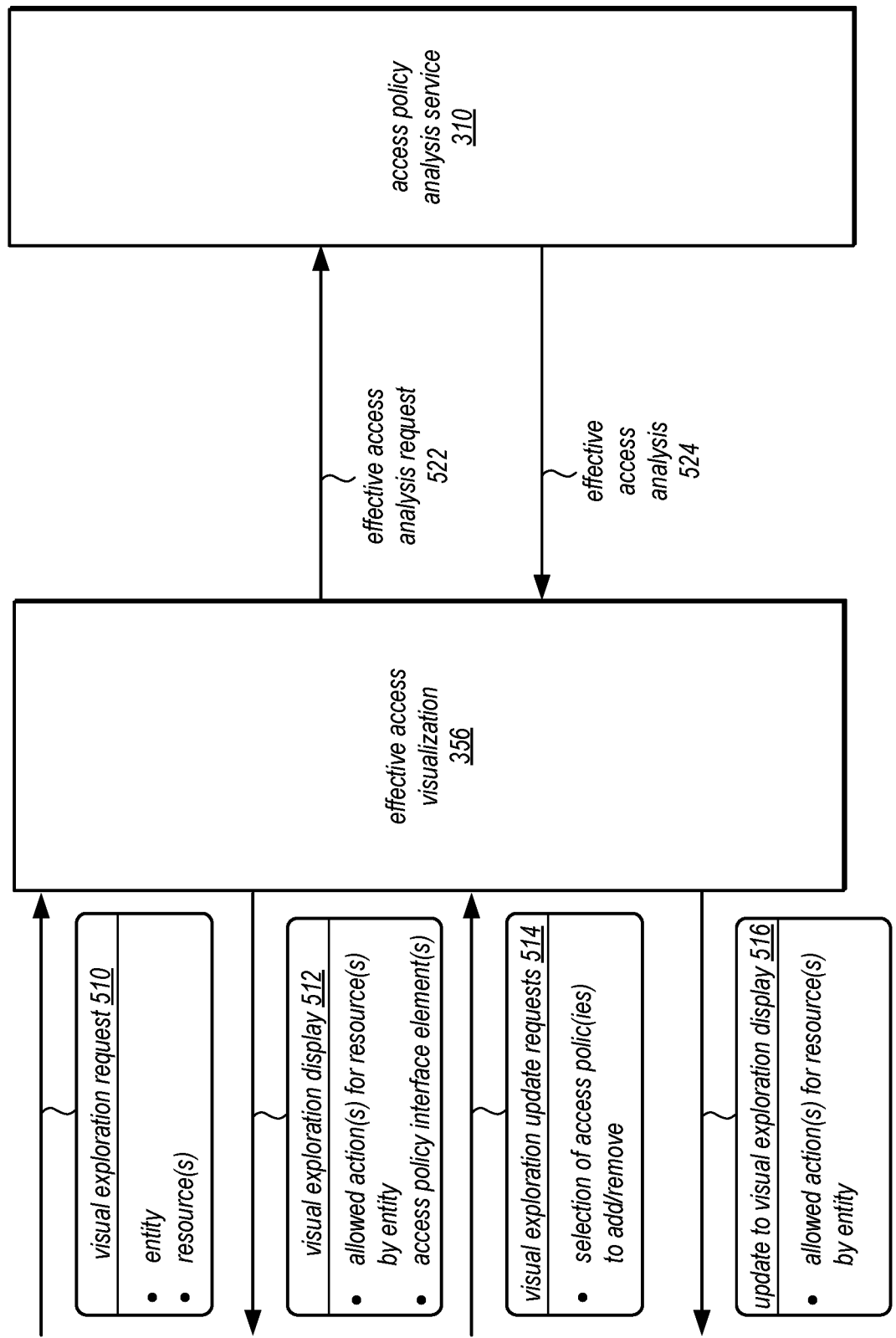
FIG. 5 is a block diagram illustrating interactions with effective access visualization and access policy analysis service, according to some embodiments.

FIG. 5 is a block diagram illustrating interactions with effective access visualization and access policy analysis service, according to some embodiments. Effective access visualization 356 may handle requests to obtain effective access. For example, effective access visualization 356 generate and provide various graphical user interface elements, such as those illustrated in FIG. 6, which may include one or more user interface elements through which visual exploration request 510 may be received. For example, effective access visualization 356 may generate a web page with various user interface elements (e.g., via HTML or other web page interface technologies (e.g., JavaScript)).

As part of the request 510, an entity (e.g., principal) may be identified along with one or more resource(s). Effective access visualization 356 may generate a request 512 for an effective access analysis according to an interface for access policy analysis service 310. The request 512 may include an identifier for the entity (e.g., principal ID) and identifier(s) for the resource(s). Access policy analysis service 310 may generate the effective access analysis according to the techniques discussed above with regard to FIGS. 1-3. Effective access analysis 524 may be returned. In some embodiments, in addition to the effective access analysis 524, the applicable access policies that were used to determine the effective access analysis may be provided.

Effective access visualization 356 may generate and provide via the visual exploration user interface element, visual exploration display 512, which may include the allowed action(s) for resource(s) by the entity and the access policy interface elements that correspond to the applicable access policies and are selectable to add or remove the corresponding access policies, as discussed below.

As indicated at 514, visual exploration update requests may be received which select access polic(ies) to add or remove (e.g., using the access policy interface elements). Again, effective access visualization 356 may generate and send an effective access analysis request 522. For this request, additional parameters such as access policies to ignore or to include in the access policy analysis performed by access policy analysis service 310. For example, access policy analysis service 310 may perform the same access policy analysis techniques, traversing a tree structure of policy summaries, but may ignore from encountered policy summaries those portions of a removed access policy. The result, which may be an updated effective access analysis, may be returned, as indicated at 524. Effective access visualization may then provide an update to the visual exploration display, as indicated at 516, and discussed in detail below with regard to FIG. 7.

Figure 6:
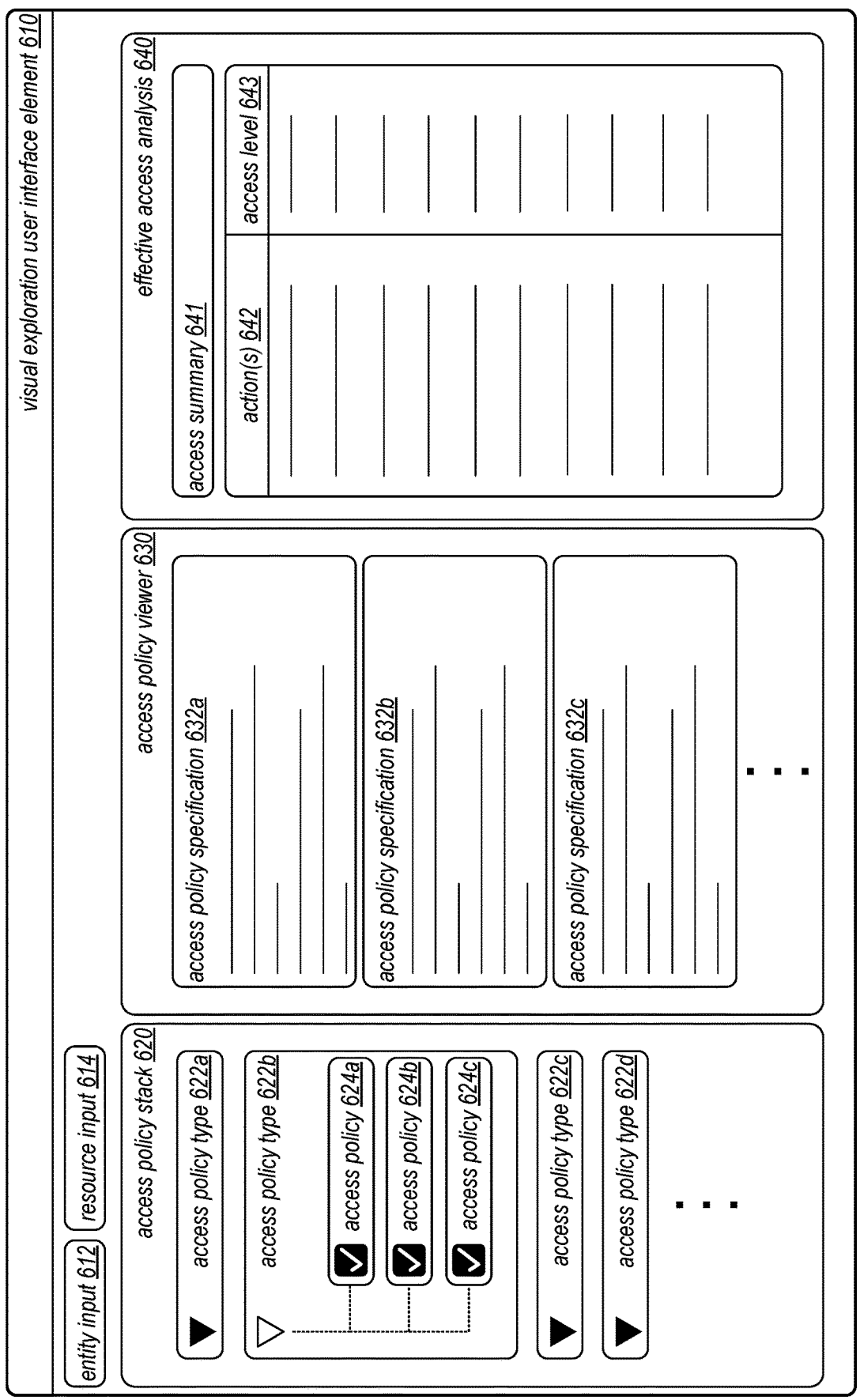
FIG. 6 is an example visual exploration user interface element, according to some embodiments.

Various configurations or arrangements of user interface elements may be implemented to provide visual exploration for efficient access analysis. For example, instead of a single page display, a series of windows, pages, or other display elements may be provided to obtain inputs (e.g., for navigating and selecting access policies) and/or for view an effective access analysis and applicable policies. Therefore, FIG. 6 is one example of many possible visual exploration user interface elements, according to some embodiments.

Visual exploration user interface element 610 may implement an entity input element 612 and resource input element 614. These elements, 612 and 614, may be drop-down lists, text or other search input interfaces through which an entity and resource for obtaining a effective access analysis 640 and access policy stack 620.

Visual exploration user interface element 610 may implement access policy stack 620. Access policy stack 620 may group, arrange, or otherwise organize applicable access policies (e.g., returned by access policy analysis service 330 as discussed above with regard to FIG. 5) that are used to determine the effective access in effective access analysis 640 according to access policy type, such access policy type 622a, 622b, 622c, and 622d. As discussed above, different access policy types may include service control policies, resource-based policies, identity-based policies, or permission boundary policies. In some embodiments, access policy types may be arranged in order of applicable scope (e.g., service control policy→group policy →user policy→resource policy). In this way, access policy stack 620 may allow a user to expand and explore the different access policy types 622 that are potentially applicable to other resources or entities according to their scope (e.g., selecting service control policy category may display those service control policies that may be applicable to all resources in a service and all users in that service including the received entity and resource for which the effective access analysis is performed).

In some embodiments, access policy stack 620 may provide access policy types 622 that are expandable, so that those specific applicable access policies that are applicable to the receive input and resource are discoverable in their access policy type within the access policy stack (e.g., relative to the access policy types with greater or lesser scope). For example, as illustrated in FIG. 6, access policy type 622b may be expanded to indicate three different access policies, 624a, 624b, and 624c. These access policies may be provided as selectable access policy interface elements, which may be selected to add or remove the access policy from the effective access analysis, as discussed in detail below with regard to FIG. 7. In some embodiments, these access policy elements may also be selectable to view the corresponding access policy text in access policy viewer 630, in some embodiments.

In some embodiments, visual exploration user interface element 610 may include access policy viewer 630. Access policy viewer 630 may display the specification of respective access policies that are applicable to the received user and resource to determine the effective access analysis, such as access policy specifications 632*a*, 632*b*, and 632*c*. Access policy specification 632 may provide the text of the respective policies. In some embodiments, access policy specifications may support various types of interactions, highlighting, searching, expanding or condensing features, and so on either through direct interactions with the access policy specifications 632, or through other user interface elements (e.g., a selection of access policy 624 may cause the access policy to be displayed, highlighted, or otherwise indicated in access policy viewer 630.

In some embodiments, visual exploration user interface element 610 may implement effective access analysis 640, which may display the effective analysis determined for the entity and resource. In some embodiments, an access summary 641 may be included, which may illustrate the different types of access levels 643 that are included, as well as the respective number of actions 642 with that access level. In some embodiments, access summary 641 may be used to provide various filtering or other interface elements to display those actions 642 in the effective access analysis 640 with that the selected access level 643. The details of effective access analysis 640 may be displayed as action(s) 642 and access level 643. As discussed above, action(s) 642 may be actions performed by entities with respect to resources. For example, entity actions may include various API calls or other commands that may be performed by a principal with respect to a resource hosted in a service of a cloud service provider. The access levels 643 may be various permissions, such as yes/no, read-only, read/write, describe/list, or other permissions for performing actions, in some embodiments.

Figure 7:
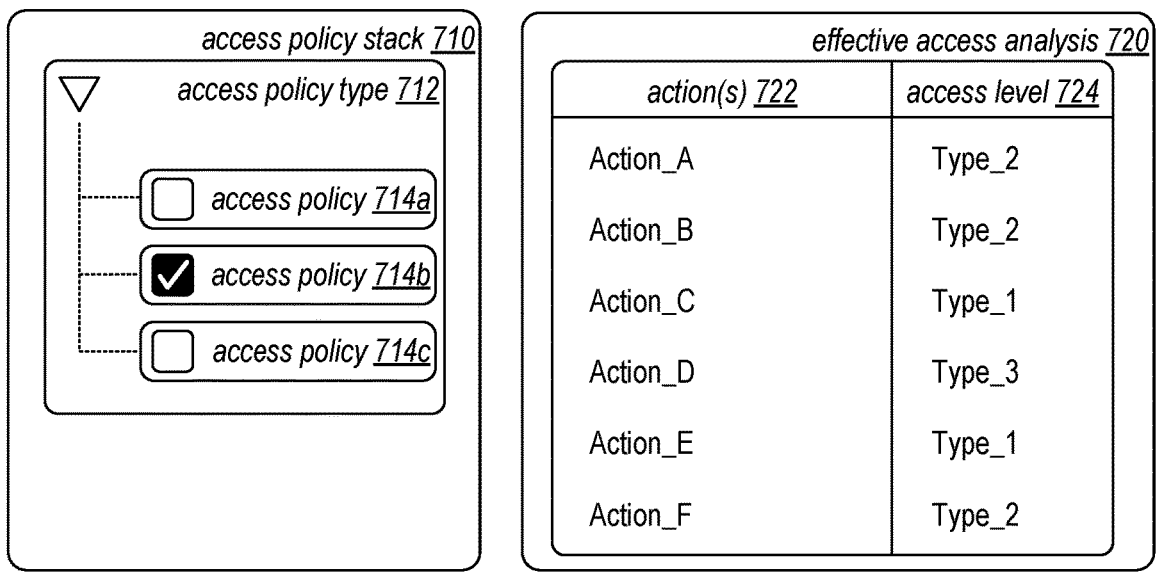
FIG. 7 is an example of updating an effective access in a visual exploration user interface element, according to some embodiments.
Figure 7:
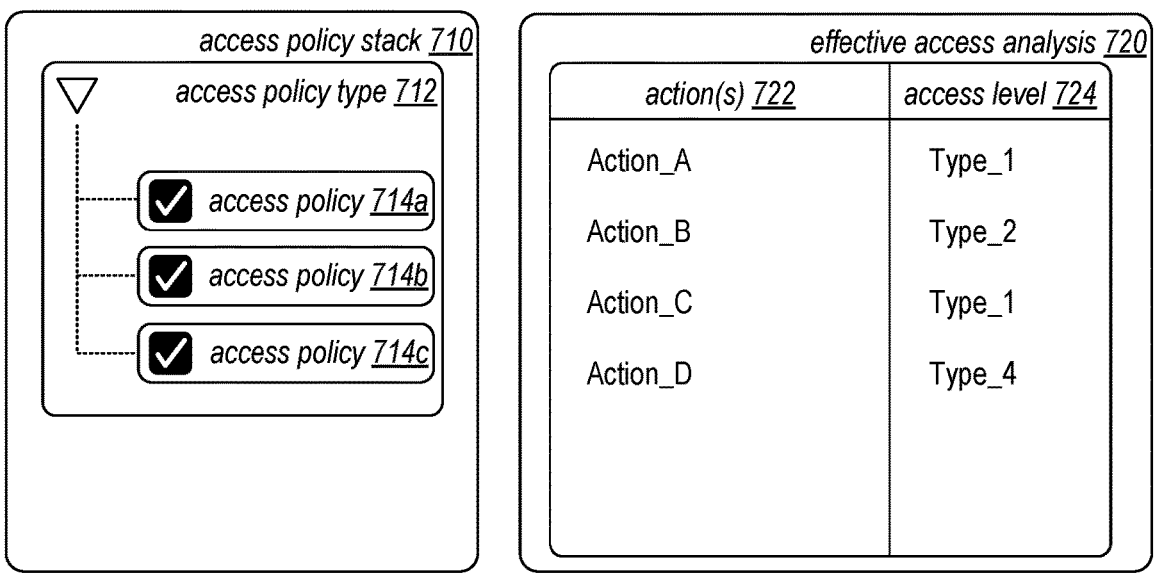

FIG. 7 is an example of updating an effective access in a visual exploration user interface element, according to some embodiments. In scene 702, access policy stack 710 and effective access analysis 720 may be generated and provided for an entity and a resource. For example, access policy stack 710 may include an access policy type 712, which includes access policies 714*a*, 714*b*, and 714*c*. Effective access analysis 720 that provides the actions 722 and corresponding access levels 724.

Access policy elements 714 may be selectable to add or remove the access policies from the effective access analysis 720. In some embodiments, selections may be marking (e.g., the checkmark) those access policies that are to be included in effective access analysis. As an initial display, all access policies may be checked, as depicted above with regard to FIG. 6. After the initial display, access policies may be removed. For example, access policies 714*a* and 714*c* may have been unchecked, so that effective access analysis 722 and access level 724 is based on access policy 714*b* and do not include access policy 714*a* and 714*c*.

In scene 704, access policies may be added. For example, both access policy 714*a* and access policy 714*c* have been marked to add those access policies to include in effective access analysis 720. For example, the number of allowed actions has been reduced by adding the access policies, as depicted by the change in actions 722 between scenes 702 and 704. Likewise, access level 724 may be updated, which may include retaining the same access level or may provide a change in access level (e.g., at Action_D and Action_A). The change to effective access analysis 720 between scenes 702 and 704 may occur interactively, wherein a selection at one of elements 714 may cause the change in the effective access analysis 720 automatically.

Figure 8:
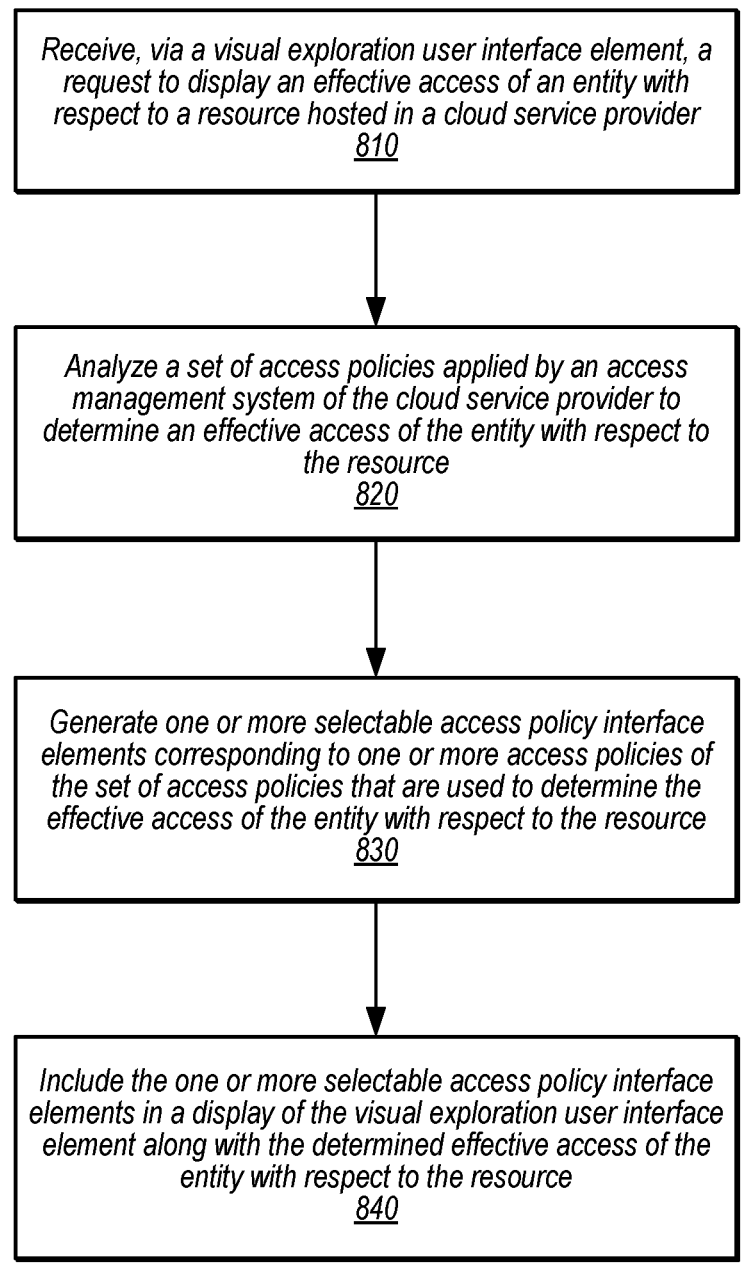
FIG. 8 is a flowchart illustrating a method that uses visual exploration for efficient analysis for cloud provider entities, according to some embodiments.

The examples of an access policy analysis system that uses visual exploration for efficient access analysis as discussed in FIGS. 2-7 above have been given in regard to a cloud security service. However, various other types of systems, services, or applications can advantageously implement using visual exploration for efficient analysis for cloud provider entities, in other embodiments. FIG. 8 is a flowchart illustrating a method that uses visual exploration for efficient analysis for cloud provider entities, according to some embodiments. These techniques, as well as the techniques discussed below with regard to FIG. 9, may be implemented using components or systems as described above with regard to FIGS. 1-7, as well as other types of systems, and thus the following discussion is not intended to be limiting as to the other types of systems that may implement the described techniques.

As indicated at 810, a request to display an effective access of an entity with respect to a resource hosted in a cloud service provider, in various embodiments. The request may be received via a visual exploration user interface element, in some embodiments. For example, in some embodiments, a single page may display input elements which may be used to provide the entity identifier and resource identifier. In some embodiments, the visual exploration user interface element may use a sequence of input elements to obtain the entity and resource, such as the various exploration paths discussed above with regard to FIG. 4.

As indicated at 820, a set of access policies applied by an access management system of the cloud service provider may be analyzed to determine an effective access of the entity with respect to the resource, in some embodiments. For example, a tree or other data structure that includes access policy summaries may be traversed to identify those applicable access policies as well as the effect of those applicable access policies in order to determine the allowed actions and access levels to provide in the effective access as discussed in detail above with regard to FIGS. 1-3. In some embodiments, analysis of the set of access policies may be performed on demand, where instead of using stored policy summaries, the set of access policies may be evaluated after the request is received. Note that different types of access policy analysis techniques to determine the allowed actions and corresponding access levels may be implemented, and thus the previous examples are not intended to be limiting.

As part of determining the effective access of the entity and resource, the applicable access policies used to determine the effective access (as not all access policies may be applicable) may be identified. As indicated at 830, one or more selectable access policy interface elements corresponding to one or more access policies of the set of access policies (e.g., the identified applicable access policies) that are used to determine the effective access of the entity with respect to the resource may be generated. For example, an effective access visualization system implemented as part of an access analysis system, may render, create, or otherwise include user interface elements that allow a user to select a corresponding access policy for inclusion in the effective access analysis, such as the checkbox elements illustrated in FIGS. 6 and 7.

As indicated at 840, the one or more selectable access policy interface elements may be included in a display of the visual exploration user interface element along with the determined effective access of the entity with respect to the resource, in some embodiments. For example, the selectable access policy interface elements may be included in a policy stack, like the policy stacks discussed above with regard to FIGS. 6 and 7. In this way, the policy type for the access policies may be indicated, as well as the relative scope of the access policies compared with other access policies in other access policy types that are applicable to the effective access. Other features may be included in the display of the visual exploration user interface element, such as a policy viewer that provides specifications of the applicable access policies, as discussed above with regard to FIG. 7.

Figure 9:
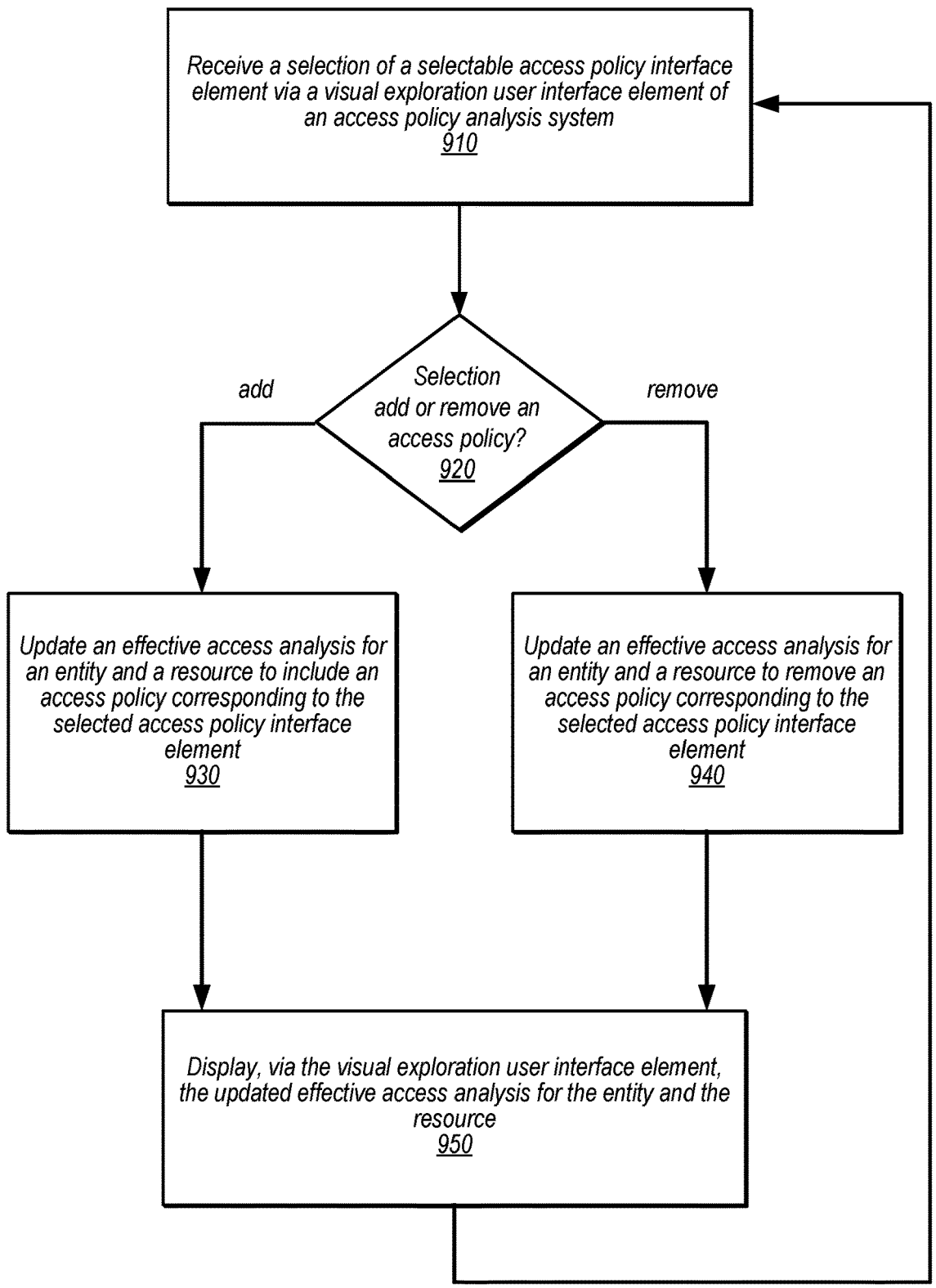
FIG. 9 is a flowchart illustrating a method for updating an effective access according to selections of access policy interface elements, according to some embodiments.

FIG. 9 is a flowchart illustrating a method for updating an effective access according to selections of access policy interface elements, according to some embodiments. As indicated at 910, a selection of a selectable access policy interface element may be received via a visual exploration user interface element of an access policy analysis system. A marking, such as the check-box interface element discussed above, or various other selectable user interface elements may be implemented to support receiving the selection. As indicated at 920, the selection may be to add or remove an access policy, in some embodiments. For example, marking an interface element to include the access policy, may be a selection to add an access policy, whereas un-marking an interface element to not include the access policy, may be a selection to remove an access policy.

As indicated at 930, an effective access analysis for an entity and a resource may be updated to include an access policy corresponding to the selected access policy interface element, in some embodiments. For example, a request to an access analysis component, as discussed above with regard to FIG. 5, may indicate the additional access policy to include when performing the analysis to determine the effective access. Similarly, as indicated at 940, an effective access analysis for an entity and a resource may be updated to remove an access policy corresponding to the selected access policy interface element, in some embodiments. For example, a request to an access analysis component, as discussed above with regard to FIG. 5, may indicate the access policy to ignore when performing the analysis to determine the effective access. As indicated at 950, the updated effective access analysis for the entity and the resource may be displayed via the visual exploration user interface element, in some embodiments. The display of the update may be automatically performed in the visual exploration user interface element after the selection to provide an interactive interface experience.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may be configured to implement the functionality described herein (e.g., the functionality of various servers and other components that implement a provider network described herein). The various methods as illustrated in the figures and described herein represent example embodiments of methods. The order of any method may be changed, and various elements may be added, reordered, combined, omitted, modified, etc.

Figure 10:
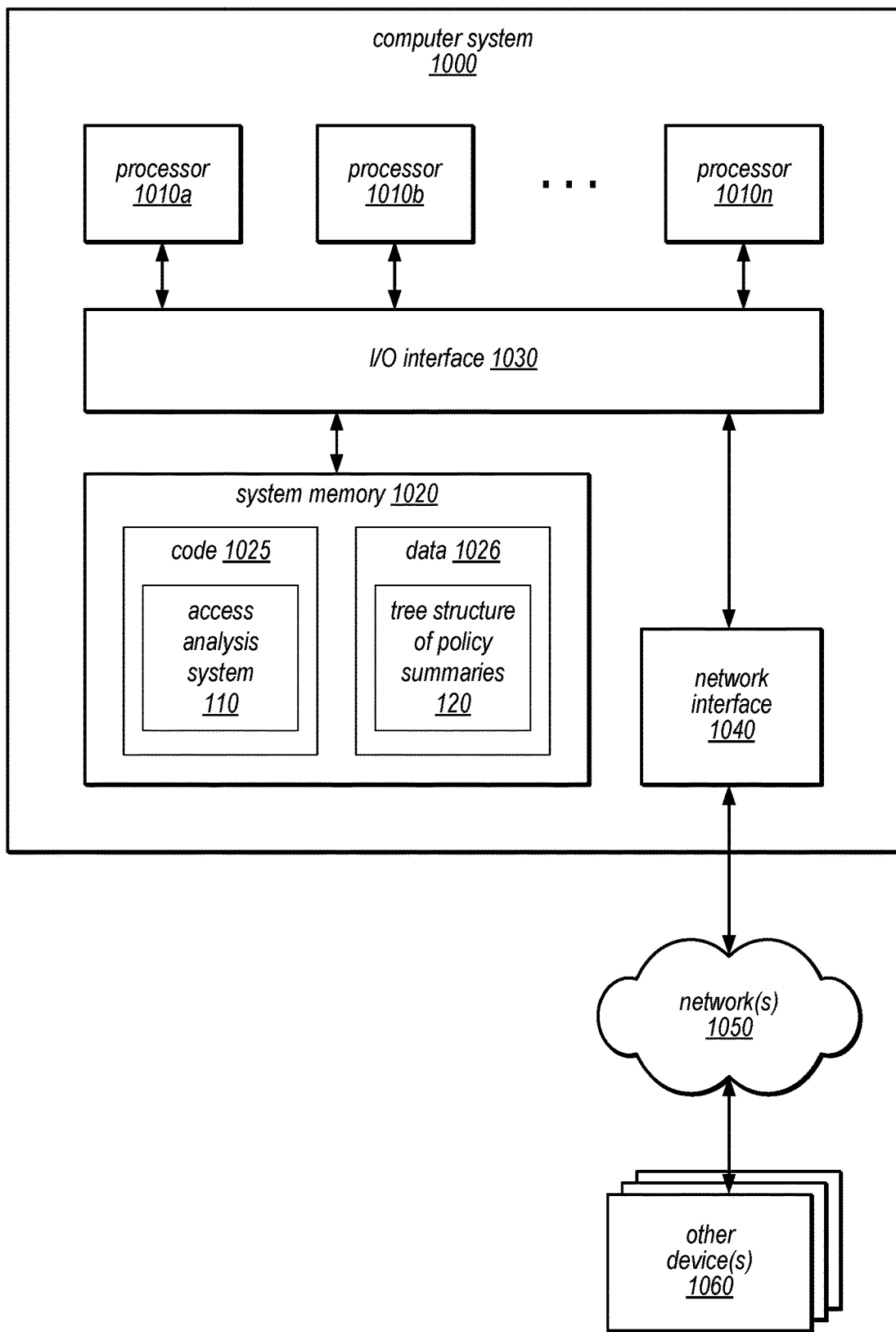
FIG. 10 is a block diagram illustrating an example computer system that can be used to implement one or more portions of an access analysis system, according to some embodiments.

FIG. 10 is a block diagram illustrating an example computer system that can be used for visual exploration for efficient access analysis, according to some embodiments. For example, the computer system 1000 may be a server that implements one or more components of the access analysis system 110 of FIG. 1. In some embodiments, the computer system 1000 may be used to implement one or more components of the cloud security service 330 of FIG. 3.

Computer system 1000 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 1000 includes one or more processors 1010, which may include multiple cores coupled to a system memory 1020 via an input/output (I/O) interface 1030. Computer system 1000 further includes a network interface 1040 coupled to I/O interface 1030. In some embodiments, computer system 1000 may be a uniprocessor system including one processor 1010, or a multiprocessor system including several processors 1010*a-n*, as shown. The processors 1010 may be any suitable processors capable of executing instructions. For example, in various embodiments, processors 1010 may implement one of a number of instruction set architectures (ISAs), such as the x86, PowerPC, SPARC, or MIPS ISA.

As shown, the computer system 1000 may also include one or more network communication devices (e.g., network interface 1040) for communicating with other systems and/or components over a communications network. For example, an instance of an application executing on computer system 1000 may use network interface 1040 to communicate with another server application executing on another computer system, as described herein.

As shown, computer system 1000 may use its network interface 1040 to communicate with one or more other devices 1060, such as persistent storage devices and/or one or more I/O devices. In some embodiments, some of these other devices may be implemented locally on the computer system 1000, accessible via the I/O interface 1030. In various embodiments, persistent storage devices may include disk drives, tape drives, solid state memory, other mass storage devices, or any other persistent storage device. The computer system 1000 may store instructions and/or data in persistent storage devices, and retrieve the stored instruction and/or data as needed.

As shown, the computer system 1000 may include one or more system memories 1020 that store instructions and data accessible by processor(s) 1010. In various embodiments, system memories 1020 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 1020 may be used to store code 1025 or executable instructions to implement the methods and techniques described herein. For example, the executable instructions may include instructions to implement the access analysis system 110, as discussed. The system memory 1020 may also be used to store data 1026 needed or produced by the executable instructions. For example, the in-memory data 1026 may include portions of a tree structure of policy summar(ies) 120, as discussed.

In some embodiments, some of the code 1025 or executable instructions may be persistently stored on the computer system 1000 and may have been loaded from external storage media. The persistent storage of the computer system 1000 and the external media are examples of non-transitory computer-readable storage media, which may be used to store program instructions to be executed by the computer system 1000. A non-transitory computer-readable storage medium may provide the capability to store information in a form readable by a machine (e.g., computer system 1000). Non-transitory computer-readable media may include storage media such as magnetic or optical media, disk or DVD/CD-ROM devices, archival tapes, network-attached storage systems, or other computer systems.

In some embodiments, the I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

In some embodiments, the network interface 1040 may allow data to be exchanged between computer system 1000 and other devices attached to a network. The network interface 1040 may also allow communication between computer system 1000 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems 1000. Multiple input/output devices may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1050. Network interface 1040 may commonly support one or more wireless networking protocols (e.g., Wi-Fi/IEEE 802.11, or another wireless networking standard). In some embodiments, the network interface 1040 may support communication via telecommunications/telephony networks such as analog voice networks or digital fiber communications networks, via storage area networks such as Fibre Channel SANs, or via any other suitable type of network and/or protocol.

Although the embodiments above have been described in considerable detail, numerous variations and modifications may become apparent to those skilled in the art once the disclosed inventive concepts are fully appreciated. It is intended that the following claims be interpreted to embrace all such variations and modifications, and the above description to be regarded in an illustrative rather than a restrictive sense.

What is claimed is:

1. A system for analyzing access policies controlling access by one or more entities to one or more cloud computing resources hosted by a cloud service provider, the system comprising:
   one or more hardware processors configured to:
      receive, via a visual exploration graphical user interface (GUI), a request to display actions that an entity is allowed to perform with respect to a cloud computing resource; and
      responsive to receiving the request:
         analyze a set of access policies applied by a platform of the cloud service provider to identify, from among the set of access policies, a subset of one or more access policies applicable to the entity and the cloud computing resource;
         determine, using the subset of one or more access policies, a first set of one or more actions that the entity is allowed to perform with respect to the cloud computing resource; and
         generate, within the visual exploration GUI:
            one or more selectable GUI elements corresponding to one or more access policies in the subset of one or more access policies, and
            one or more GUI elements corresponding to one or more actions in the first set of one or more actions;
      simulate, within the visual exploration GUI, updating a set of controlling policies, the simulating comprising:
         receiving input, via at least one of the one or more selectable GUI elements, indicating that at least one of the one or more access policies is to be added to or removed from the set of controlling policies, and
         responsive to the input, updating the visual exploration GUI to display a second set of one or more actions that the entity would be allowed to perform with respect to the cloud computing resource if the at least one or more of the one or more access policies were added to or removed from the set of controlling policies, wherein the first set of one or more actions is different from the second set of one or more actions;
      configure the platform of the cloud service provider to control access to the one or more cloud computing resources in accordance with an updated set of controlling policies obtained via the addition or removal of the at least one of the one or more access policies to or from the set of controlling policies; and
      cause the platform of the cloud service provider to execute one or more security services in accordance with the updated set of controlling policies.

2. The system of claim 1, wherein the one or more hardware processors are further configured to:
   update the visual exploration GUI to display one or more access levels corresponding to the second set of one or more actions.

3. The system of claim 1, wherein the input indicating that at least one of the one or more access policies is to be added or removed from the set of controlling policies indicates that the at least one of the one or more access policies is to be removed from the set of controlling policies.

4. The system of claim 1, wherein the one or more selectable GUI elements corresponding to one or more access policies in the subset of access policies are displayed in a policy stack that organizes access policies into one or more policy types, and wherein the one or more policy types are arranged in an order of applicable scope.

5. The system of claim 1, wherein the cloud computing resource is selected from the group consisting of: a service resource, a system resource, an application resource, a data storage resource, a networking resource, an orchestration resource, and a metrics resource.

6. The system of claim 1, wherein the one or more hardware processors are further configured to generate, within the visual exploration GUI: one or more actions, and one or more GUI elements corresponding to one or more access levels associated with the one or more actions in the first set of one or more actions.

7. The system of claim 1, wherein the visual exploration GUI is implemented as part of a user interface of a cloud security service.

8. A method for analyzing access policies controlling access by one or more entities to one or more cloud computing resources hosted by a cloud service provider, the method comprising:
    using one or more hardware processors to perform:
        receiving, via a visual exploration graphical user interface (GUI), a request to display actions that an entity is allowed to perform with respect to a cloud computing resource; and
        responsive to receiving the request:
            analyzing a set of access policies applied by a platform of the cloud service provider to identify, from among the set of access policies, a subset of one or more access policies applicable to the entity and the cloud computing resource;
            determining, using the subset of one or more access policies, a first set of one or more actions that the entity is allowed to perform with respect to the cloud computing resource; and
            generating, within the visual exploration GUI:
                one or more selectable GUI elements corresponding to one or more access policies in the subset of one or more access policies, and
                one or more GUI elements corresponding to one or more actions in the first set of one or more actions;
            simulating, within the visual exploration GUI, updating a set of controlling policies, the simulation comprising:
                receiving input, via at least one of the one or more selectable GUI elements, indicating that at least one of the one or more access policies is to be added to or removed from the set of controlling policies, and
                responsive to the input, updating the visual exploration GUI to display a second set of one or more actions that the entity would be allowed to perform with respect to the cloud computing resource if the at least one of the one or more access policies were added to or removed from the set of controlling policies, wherein the first set of one or more actions is different from the second set of one or more actions;
            configuring the platform of the cloud service provider to control access to the one or more cloud computing resources in accordance with an updated set of controlling policies obtained via the addition or removal of the at least one of the one or more access policies to or from the set of controlling policies; and
            causing the platform of the cloud service provider to execute one or more security services in accordance with the updated set of controlling policies.

9. The method of claim 8, further comprising:
    updating the visual exploration GUI to display one or more access levels corresponding to the second set of one or more actions.

10. The method of claim 8, wherein the input indicating that at least one of the one or more access policies is to be added or removed from the set of controlling policies indicates that the at least one of the one or more access policies is to be removed from the set of controlling policies.

11. The method of claim 8, wherein the one or more selectable GUI elements corresponding to one or more access policies in the subset of access policies are displayed in a policy stack that organizes access policies into one or more policy types, and wherein the one or more policy types are arranged in an order of applicable scope.

12. The method of claim 8, wherein the subset of access policies is displayed in a policy viewer portion of the visual exploration GUI.

13. The method of claim 8, further comprising:
    generating, within the visual exploration GUI, one or more GUI elements corresponding to one or more access levels associated with the one or more actions in the first set of one or more actions.

14. The method of claim 8, wherein the visual exploration GUI is implemented as part of a user interface of a cloud security service.

15. One or more non-transitory computer-accessible storage media storing program instructions that, when executed on or across one or more hardware processors, cause the one or more hardware processors to perform:
    receiving, via a visual exploration graphical user interface (GUI), a request to display actions that an entity is allowed to perform with respect to a cloud computing resource; and
    responsive to receiving the request:
        analyzing a set of access policies applied by a platform of a cloud service provider to identify, from among the set of access policies, a subset of one or more access policies applicable to the entity and the cloud computing resource;
        determining, using the subset of one or more access policies, a first set of one or more actions that the entity is allowed to perform with respect to the cloud computing resource; and
        generating, within the visual exploration GUI:
            one or more selectable GUI elements corresponding to one or more access policies in the subset of access policies, and
            one or more GUI elements corresponding to one or more actions in the first set of one or more actions;
        simulating, within the visual exploration GUI, updating a set of controlling policies, the simulation comprising:
            receiving input, via at least one of the one or more selectable GUI elements, indicating that at least one of the one or more access policies is to be added to or removed from the set of controlling policies, and
            responsive to the input, updating the visual exploration GUI to display a second set of one or more actions that the entity would be allowed to perform with respect to the cloud computing resource if the at least one of the one or more access policies were added to or removed from the set of controlling policies, wherein the first set of one or more actions is different from the second set of one or more actions;

configuring the platform of the cloud service provider to control access to the one or more cloud computing resources in accordance with an updated set of controlling policies obtained via the addition or removal of the at least one of the one or more access policies to or from the set of controlling policies; and causing the platform of the cloud service provider to execute one or more security services in accordance with the updated set of controlling policies.

16. The one or more non-transitory computer-accessible storage media of claim 15, storing further program instructions that further cause the one or more hardware processors to perform:

updating the visual exploration GUI to display one or more access levels corresponding to the second set of one or more actions.

17. The one or more non-transitory computer-accessible storage media of claim 15, wherein the input indicating that the at least one of the one or more access policies is to be added or removed from the set of controlling policies indicates that the at least one of the one or more access policies is to be removed from the set of controlling policies.

18. The one or more non-transitory computer-accessible storage media of claim 15, wherein the one or more selectable GUI elements corresponding to the one or more access policies in the subset of one or more access policies are displayed in a policy stack that organizes access policies into one or more policy types, and wherein the one or more policy types are arranged in an order of applicable scope.

19. The one or more non-transitory computer-accessible storage media of claim 15, wherein the subset of one or more access policies is displayed in a policy viewer portion of the visual exploration GUI.

20. The one or more non-transitory computer-accessible storage media of claim 15, wherein the visual exploration GUI is implemented as part of a user interface of a cloud security service.

* * * * *

UNITED STATES PATENT AND TRADEMARK OFFICE
CERTIFICATE OF CORRECTION

Page 1 of 1

PATENT NO. : 12,335,267 B1
APPLICATION NO. : 17/669146
DATED : June 17, 2025
INVENTOR(S) : Evan Samek et al.

It is certified that error appears in the above-identified patent and that said Letters Patent is hereby corrected as shown below:

In the Claims

Claim 1, at Column 24, Line 40:
"if the at least one or more of the one or more"
Should read:
-- if the at least one of the one or more --

Claim 6, at Column 25, Lines 10 and 11:
"within the visual exploration GUI: one or more actions, and one or more, GUI elements corresponding to one or more"
Should read:
-- within the visual exploration GUI: one or more GUI elements corresponding to one or more --

Claim 8, at Column 25, Line 37:
"generating, within the visual exploration GUI;"
Should read:
-- generating, within the visual exploration GUI: --

Signed and Sealed this
Nineteenth Day of August, 2025

Coke Morgan Stewart
*Acting Director of the United States Patent and Trademark Office*